(12) United States Patent
Arnold

(10) Patent No.: US 7,792,521 B2
(45) Date of Patent: Sep. 7, 2010

(54) METHOD, APPARATUS, AND COMPUTER PROGRAM PRODUCT FOR MANAGING CONTENT ITEMS

(75) Inventor: Steve Arnold, Yateley (GB)

(73) Assignee: Nokia Corporation, Espoo (FI)

( * ) Notice: Subject to any disclaimer, the term of this patent is extended or adjusted under 35 U.S.C. 154(b) by 625 days.

(21) Appl. No.: 11/287,948

(22) Filed: Nov. 28, 2005

(65) Prior Publication Data

US 2007/0123241 A1    May 31, 2007

(51) Int. Cl.
*H04M 3/00* (2006.01)
(52) U.S. Cl. .............. 455/418; 455/414.1; 455/405; 455/419; 455/420; 455/423; 709/203; 709/206; 709/220; 340/3.3; 707/610; 707/621; 707/663; 707/664
(58) Field of Classification Search .......... 455/418, 455/466, 414.1, 405; 709/203, 206, 220; 707/610, 621, 663, 664
See application file for complete search history.

(56) References Cited

U.S. PATENT DOCUMENTS

| 5,201,010 | A  | * | 4/1993 | Deaton et al. | 382/139 |
| 5,974,238 | A  | * | 10/1999 | Chase, Jr. | 709/248 |
| 6,141,664 | A  | * | 10/2000 | Boothby | 707/201 |
| 6,275,569 | B1 | * | 8/2001 | Cannon | 379/88.01 |
| 6,647,409 | B1 | * | 11/2003 | Sherman et al. | 709/203 |
| 6,654,787 | B1 | * | 11/2003 | Aronson et al. | 709/206 |
| 7,102,485 | B2 | * | 9/2006 | Williams | 340/3.3 |
| 7,143,105 | B2 | * | 11/2006 | Nakano et al. | 707/102 |
| 2002/0172118 | A1 | * | 11/2002 | Yamada et al. | 369/53.31 |
| 2005/0164720 | A1 | * | 7/2005 | Huang | 455/466 |
| 2005/0223085 | A1 | * | 10/2005 | Giles et al. | 709/220 |

* cited by examiner

*Primary Examiner*—Stephen M D'Agosta
(74) *Attorney, Agent, or Firm*—Alston & Bird LLP

(57) ABSTRACT

It is presented a method for managing content items of a mobile communication terminal. The method comprises the steps of: reading a current time, selecting at least one content item, reading a time of last access of said at least one selected content item, calculating a difference between said current time and said time of last access of said at least one selected content item, and conditionally deleting said at least one selected content item, said condition of deleting comprising at least that said difference is larger than a threshold value. A corresponding mobile communication terminal and computer program are also presented.

16 Claims, 3 Drawing Sheets

METHOD, APPARATUS, AND COMPUTER PROGRAM PRODUCT FOR MANAGING CONTENT ITEMS

FIELD OF THE INVENTION

The present invention generally relates to mobile terminals and more particularly to managing memory usage in mobile terminals.

BACKGROUND OF THE INVENTION

Mobile terminals, or mobile (cellular) telephones, for mobile telecommunications systems like GSM, UMTS, D-AMPS and CDMA2000 have been used for many years now. In the older days, mobile terminals were used almost exclusively for voice communication with other mobile terminals or stationary telephones. More recently, the use of modern terminals has been broadened to include not just voice communication, but also various other services and applications such as www/wap browsing, video telephony, electronic messaging (e.g. SMS, MMS, email, instant messaging), digital image or video recording, FM radio, music playback, electronic games, calendar/organizer/time planner, word processing, etc.

With the increasing number of uses of the mobile terminal, more content items are produced, requiring an increasing amount of memory space in the mobile terminal. Memory space may quickly fill up with MMS messages, images and video clips captured with a built-in camera, downloaded applications and games etc. The user then has to perform the tedious task of viewing each content item and decide whether to keep it or delete it.

One way to alleviate the problem of increased memory requirements is to provide the mobile terminal with removable memory media, such as SD cards. When one memory media fills up, it may be replaced with a new memory media. While this provides additional memory space for the user, it creates a problem for the user to know what content item is on what media, and also requires the user to keep track of the different physical media items.

Consequently, there is a need to provide a convenient and efficient way to manage memory usage in a mobile terminal.

SUMMARY OF THE INVENTION

In view of the above, an objective of the invention is to solve or at least reduce the problems discussed above.

According to a first aspect of the invention there has been provided a method for managing content items of a mobile communication terminal, comprising the steps of: reading a current time, selecting at least one content item, reading a time of last access of the at least one selected content item, calculating a difference between the current time and the time of last access of the at least one selected content item, and conditionally deleting the at least one selected content item, the condition of deleting comprising at least that the difference is larger than a threshold value. With this method, content items that have not been accessed in a while are deleted, freeing up memory space in the mobile terminal while not requiring a large effort from the end user.

The condition of deleting may further involve: displaying a reference to the at least one selected content item, prompting for a user action confirming the deleting, and detecting a confirming user action. The user is thereby given a choice whether to delete a particular content item or not. The user may have content items of value that should be kept, stored in the mobile terminal which have not been accessed in a while.

A third aspect of the invention is a computer program comprising software instructions that, when executed in a mobile communication terminal, performs the method according to the first aspect.

Other objectives, features and advantages of the present invention will appear from the following detailed disclosure, as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Embodiments of the present invention will now be described in more detail, reference being made to the enclosed drawings, in which.

DETAILED DESCRIPTION OF THE INVENTION

Figure 1:
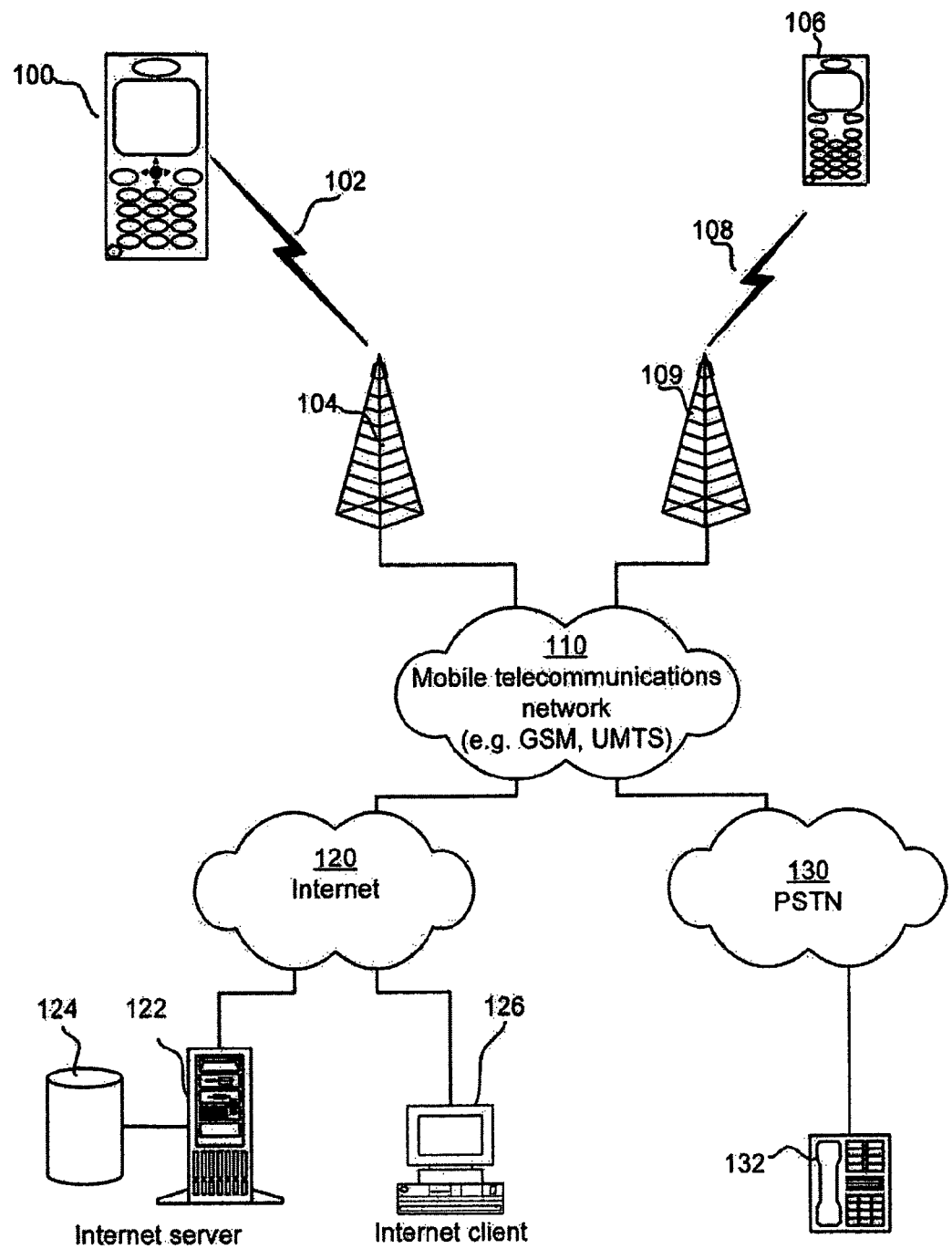
FIG. 1 is a schematic illustration of a cellular telecommunication system, as an example of an environment in which the present invention may be applied.
Figure 2:
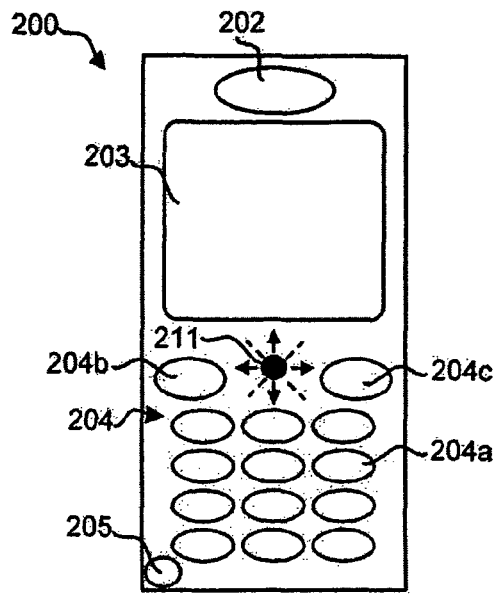
FIG. 2 is a schematic front view illustrating a mobile terminal according to an embodiment of the present invention.

FIG. 1 illustrates an example of a cellular telecommunications system in which the invention may be applied. In the telecommunication system of FIG. 1, various telecommunications services such as cellular voice calls, www/wap browsing, cellular video calls, data calls, facsimile transmissions, music transmissions, still image transmissions, video transmissions, electronic message transmissions and electronic commerce may be performed between a mobile terminal 100 according to the present invention and other devices, such as another mobile terminal 106 or a stationary telephone 132. It is to be noted that for different embodiments of the mobile terminal 100 and in different situations, different ones of the telecommunications services referred to above may or may not be available. Usage of these services results in content items being stored in the memory of the mobile terminal 100 using up an increasing amount of memory space.

The mobile terminals 100, 106 are connected to a mobile telecommunications network 110 through RF links 102, 108 via base stations 104, 109. The mobile telecommunications network 110 may be in compliance with any commercially available mobile telecommunications standard, such as GSM, UMTS, D-AMPS, CDMA2000, FOMA and TD-SCDMA.

The mobile telecommunications network 110 is operatively connected to a wide area network 120, which may be Internet or a part thereof. An Internet server 122 has a data storage 124 and is connected to the wide area network 120, as is an Internet client computer 126. The server 122 may host a www/wap server capable of serving www/wap content to the mobile terminal 100.

Figure 3:
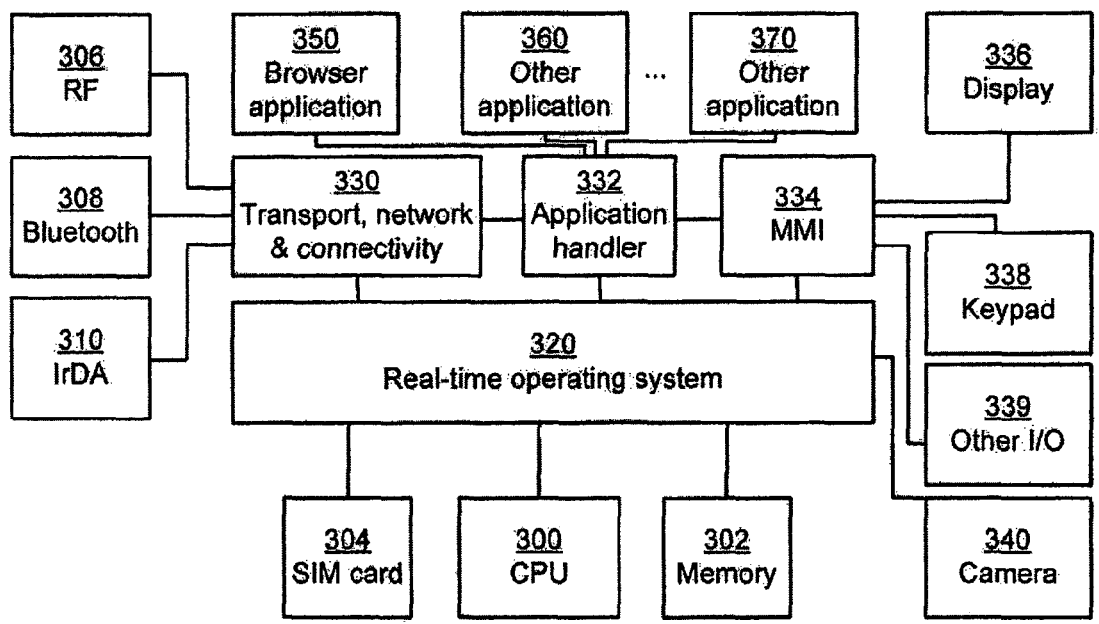
FIG. 3 is a schematic block diagram representing an internal component, software and protocol structure of the mobile terminal shown in FIG. 2.

The internal component, software and protocol structure of the mobile terminal 200 will now be described with reference to FIG. 3. The mobile terminal has a controller 300 which is responsible for the overall operation of the mobile terminal and may be implemented by any commercially available CPU ("Central Processing Unit"), DSP ("Digital Signal Processor") or any other electronic programmable logic device. The controller 300 has associated electronic memory 302 such as RAM memory, ROM memory, EEPROM memory, flash memory, or any combination thereof. The memory 302 is used for various purposes by the controller 300, one of them being for storing data and program instructions for various software in the mobile terminal. The software includes a real-time operating system 320, drivers for a man-machine interface (MMI) 334, an application handler 332 as well as various applications. The applications include a browser application 350, as well as various other applications 360 and 370, such as applications for voice calling, video calling, sending and receiving SMS, MMS or email, an instant messaging application, a phone book application, a calendar application, a word processing application, a presentation application, a spreadsheet application, a control panel application, a camera application, a media player, one or more video games, etc.

The MMI 334 also includes one or more hardware controllers, which together with the MMI drivers cooperate with the display 336/203, keypad 338/204 as well as various other I/O devices 339 such as microphone, speaker, vibrator, ringtone generator, LED indicator, etc. As is commonly known, the user may operate the mobile terminal through the man-machine interface thus formed.

The software also includes various modules, protocol stacks, drivers, etc., which are commonly designated as 330 and which provide communication services (such as transport, network and connectivity) for an RF interface 306, and optionally a Bluetooth interface 308 and/or an IrDA interface 310. The RF interface 306 comprises an internal or external antenna as well as appropriate radio circuitry for establishing and maintaining a wireless link to a base station (e.g. the link 102 and base station 104 in FIG. 1). As is well known to a person skilled in the art, the radio circuitry comprises a series of analogue and digital electronic components, together forming a radio receiver and transmitter. These components include, i.a., band pass filters, amplifiers, mixers, local oscillators, low pass filters, AD/DA converters, etc.

The mobile terminal also has a SIM card 304 and an associated reader. As is commonly known, the SIM card 304 comprises a processor as well as local work and data memory.

Figure 4:
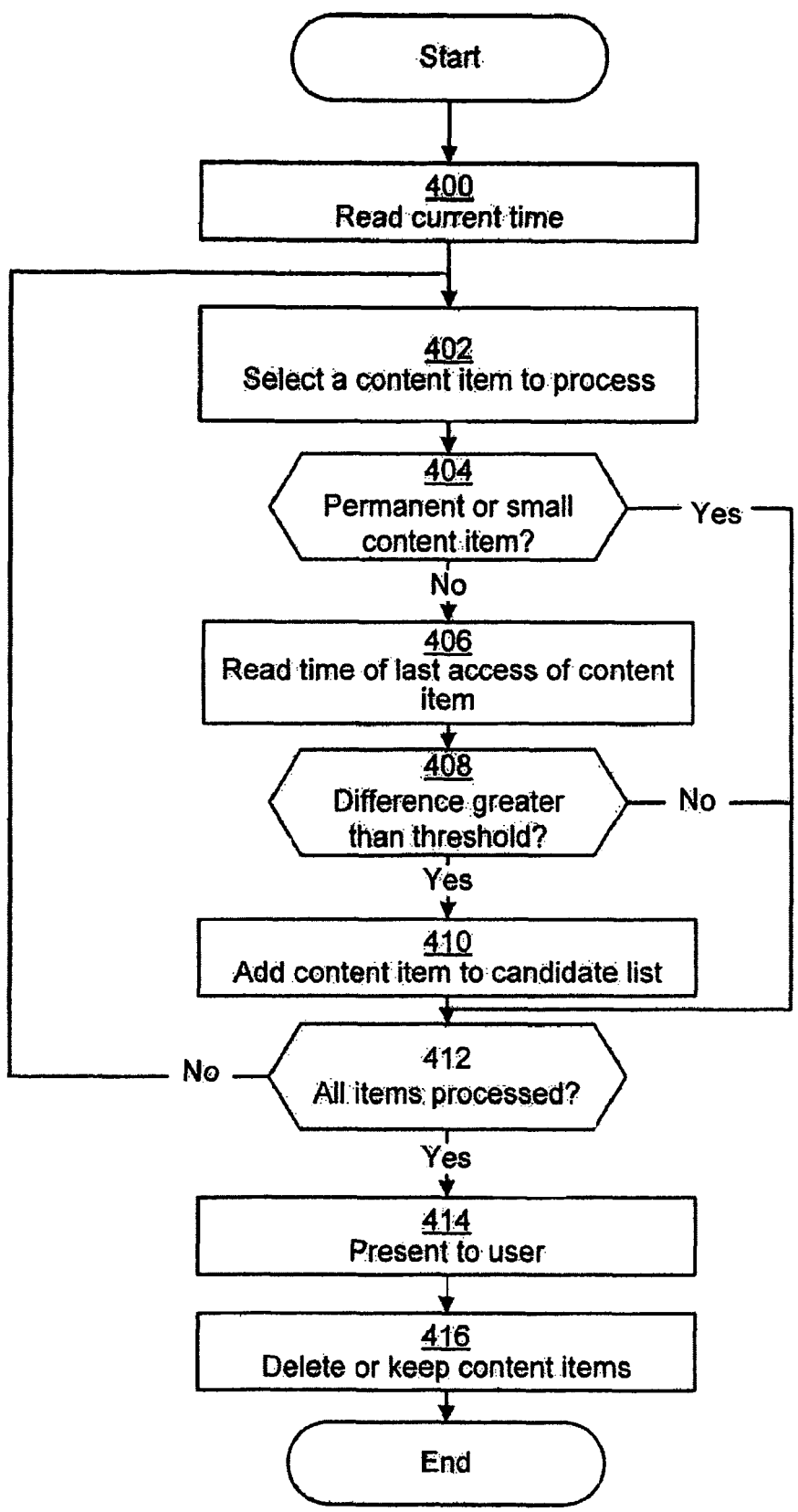
FIG. 4 is a flowchart diagram that illustrates the operation of the mobile terminal shown in FIG. 3 to manage memory usage.

With reference to FIG. 4, a method of the mobile terminal 200 for managing content items will now be described. The principle for the method is to delete content items that have not been accessed in a certain amount of time. Content items may for example be short messages, multimedia messages, electronic mails, image files, motion video files, sound files, music files, word processing documents, spreadsheet documents, presentation documents, calendar items, games, applications and web pages.

In one embodiment, the method to manage content items is embodied in software that is stored in memory 302 or another computer readable medium and scheduled to be executed by the controller 300 regularly, such as once a day or once a week. The periodicity may be fixed or it may be user configurable. Alternatively or additionally, the method may be triggered automatically when an available memory space in the mobile terminal falls below a trigger threshold. This threshold can be either in percent of total memory or a specific amount in bytes. Finally, alternatively or additionally, the method may be triggered by the user.

In an initial read current time step 400, the current time is retrieved from a clock in the mobile terminal. Preferably, both the time and the date is retrieved, or alternatively a tick value, such as milliseconds from 00:00 Jan. 1, 1970 is retrieved.

In a select a content item to process step 402, a current content item to process is selected. This content item may be a single content item, or it may be a first content item in a set. The set may be selected to be all content items in the mobile terminal, all content items of one or more content item types, or the set may be any other group of content items considered desirable to check.

In a permanent or small content item conditional step 404, it is first checked whether the content item is protected from deletion, for example by having a permanent flag associated with it set. If the permanent flag is set, it indicates that the associated content item is to be exempt from being considered to be deleted. Secondly, it is in this step checked if the content item is of a sufficient size. The user may optionally configure a minimum size to be considered for deletion. This allows, for example, the process not to consider SMS messages which may amount to a large number of items, but do not actually take up a significant amount of memory space. The lower limit of what size content items to be considered, may be set by the manufacturer or may be configurable by the user or another party. One special case is when the lower limit is 0 bytes, whereby all items considered large enough to be processed. Consequently, if there is a permanent flag associated with the current content item or the content item is too small, processing of this particular item ends and the method proceeds to an all items processed conditional step 412. On the other hand, if there is no permanent flag associated with the current content item and the content item is large enough, the method proceeds to a read time of last access of content item step 406.

In the read time of last access of content item step 406, a time associated with the last time the current content item was accessed is read.

In a difference greater than threshold conditional step 408, the difference between the current time and the time of the last time the current content item was accessed is firstly calculated. Secondly, the difference is compared to a threshold value. The threshold value may be set by the manufacturer of the mobile terminal or by the user or another party to an arbitrary time value, e.g. 12 hours, 1 day, 1 week, 1 month, 6 months, or any other time. If the difference is greater than the threshold, the content item is considered to be inactive and the method proceeds to an add content to candidate list step 410. On the other hand, if the difference is less than the threshold, the current content item has been accessed within the configured time period and is not considered to be a candidate for deletion, whereby the method proceeds to the all items processed conditional step 412.

In the add content item to candidate list step 410, the current content item has previously been selected to be inactive and is accordingly added to a candidate list. The candidate list is a list of content items that are candidates to be deleted.

In the all items processed conditional step 412, in the case that a set of content items are processed, it is checked whether all content items in the set have been processed. If all content items have been processed, the method proceeds to a present to user step 414. On the other hand, if all content items have not been processed, the method returns to the select a content item to process step 402 to process a new content item in the set.

In the present to user step 414, the user is provided with an ability to delete content items on the candidate list. As mentioned before, the candidate list contains content items that have been considered to be inactive. In one embodiment, the user is provided with a list of content items on the display, whereby the user may indicate any inactive content items to keep. This may for example be implemented with checkbox user interface elements. The user may be presented with names of all the content items on the list, and with an ability to view each content item to see what the content item is. Once the user is finished with deselecting content items to delete, the user indicates that the content items still checked should be deleted.

In one embodiment, there is no user interaction; all content items on the candidate list are subject to deletion and there is thus no operation performed in this step.

In a delete or keep content items step 416, the content items to be deleted are deleted. Content items that the user has decided to keep may be given a last time of access of the current time. Thus, these content items may not again be considered candidates for deletion during subsequent iterations of the method until the threshold value of time passes again without the content items being accessed. In one embodiment, content items that the user has decided to keep are flagged as permanent content items, whereby these content items will never be subject for deletion due to inactivity again, until the user manually clears the permanent flag for the content item in question.

In one embodiment, rather than using a candidate list, once an inactive content item is found, the user is prompted whether to keep or delete the inactive content item before the next content item is processed. In other words, a list of several items is never displayed; rather the user has to decide whether to delete or keep each individual inactive item.

Although a list of content types has been presented herein, the invention is not limited to the examples provided; any type of content manageable by a mobile terminal is within the scope of the present invention.

Each of the steps of the above-described method may be performed by respective means. While the means may be embodied in various manners, each of the means of one embodiment are embodied as computer program instructions that are stored in memory 302 and executed by the controller 300.

The invention has mainly been described above with reference to a few embodiments. However, as is readily appreciated by a person skilled in the art, other embodiments than those disclosed above are equally possible within the scope of the invention, as defined by the appended patent claims.

What is claimed is:

1. A method comprising:
 reading a current time;
 for each of a plurality of content items:
  selecting a content item,
  reading a time of last access of said selected content item,
  calculating a difference between said current time and said time of last access of said selected content item, and
  conditionally adding a reference to said selected content item to a candidate list, said condition of adding comprising at least that said difference is larger than a threshold value,
 conditionally deleting content items of the candidate list, said condition of deleting comprising at least that said difference is larger than said threshold value;
 wherein said method is triggered to be executed if an amount of available memory of a mobile communication terminal falls below a trigger threshold.

2. The method according to claim 1, wherein said condition of deleting further comprises:
 causing a reference to said at least one selected content item to be displayed,
 causing prompting for a user action confirming the deleting, and
 receiving an indication of a confirming user action.

3. The method according to claim 1, wherein if said at least one selected content item remains undeleted, said time of last access of said at least one selected content item is set to said current time.

4. The method according to claim 1, wherein if said at least one content item remains undeleted, said at least one content item becomes protected from being deleted.

5. The method according to claim 1, wherein said condition of deleting further comprises that said at least one content item is unprotected from being deleted.

6. The method according to claim 1, wherein selecting at least one content item, reading a time of last access, calculating a difference, and conditionally deleting said at least one selected content item, are repeated for a plurality of content items in a mobile communication terminal.

7. The method according to claim 6, wherein said method is scheduled to be executed on predetermined points in time.

8. The method according to claim 1, further comprising:
 casuing said candidate list to be displayed,
 causing prompting for a user action confirming the deleting, and
 receiving an indication of detecting a confirming user action.

9. The method according to claim 1, wherein said method is scheduled to be executed on predetermined points in time.

10. The method according to claim 1, wherein selecting at least one content item, reading a time of last access, calculating a difference, and conditionally adding a reference to said at least one content item, are repeated for all content items in a mobile communication terminal.

11. The method according to claim 1, wherein said at least one selected content item is of a type selected from a group consisting of a short message, a multimedia message, an electronic mail, an image file, a motion video file, a sound file, a music file, a word processing document, a spreadsheet document, a presentation document, a calendar item, a game, an application and a web page.

12. The method according to claim 1, wherein said threshold value is configurable by said user.

13. The method according to claim 1, wherein selecting at least one content item comprises conditionally selecting at least one content item, said condition of selecting comprising at least that said at least one selected content item is determined to occupy more memory space than a user defined threshold.

14. An apparatus, comprising:
 means for reading a current time,
 means for selecting a content item,
 means for reading a time of last access of said selected content item,
 means for calculating a difference between said current time and said time of last access of said selected content item, means for conditionally adding a reference to said selected content item to a candidate list, said condition of adding comprising at least that said difference is larger than a threshold value, wherein the means for selecting, the means for reading a time of last access, the means for calculating, and the means for conditionally adding are further configured to select, read a time of last access, calculate, and conditionally add, respectively, for each of a plurality of content items, and be triggered if an amount of available memory of a mobile communication terminal falls below a trigger threshold;

the apparatus further comprising means for conditionally deleting content items of the candidate list, said condition of deleting comprising at least that said difference is larger than said threshold value.

15. A computer program product comprising a computer-readable medium with software instructions stored thereon, the software instructions, when executed, being configured to:

read a current time, select a content item, read a time of last access of said selected content item, calculate a difference between said current time and said time of last access of said selected content item, conditionally add a reference to said selected content item to a candidate list, said condition of adding comprising at least that said difference is larger than a threshold value, wherein the software instructions configured to select, read a time of last access, calculate, and conditionally add are further configured to select, read a time of last access, calculate, and conditionally add repeatedly for a plurality of content items in a mobile communication terminal, and be triggered if an amount of available memory of said mobile communication terminal falls below a trigger threshold, and conditionally delete content items of the candidate list, said condition of deleting comprising at least that said difference is larger than said threshold value.

16. An apparatus comprising at least one processor and at least one memory including computer program code, the at least one memory and the computer program code configured to, with the at least one processor, cause the apparatus at least to:

read a current time, select a content item, read a time of last access of said selected content item, calculate a difference between said current time and said time of last access of said selected content item, conditionally add a reference to said selected content item to a candidate list, said condition of adding comprising at least that said difference is larger than a threshold value, wherein the apparatus caused to select, read a time of last access, calculate, and conditionally add is further caused to select, read, calculate, and conditionally add for a plurality of content items, and be triggered to select, read a time of last access, calculate, and conditionally add, if an amount of available memory of a mobile communication terminal falls below a trigger threshold, and conditionally delete content items of the candidate list, said condition of deleting comprising at least that said difference is larger than said threshold value.

\* \* \* \* \*